United States Patent [19]

Wu

[11] Patent Number: 4,743,998
[45] Date of Patent: May 10, 1988

[54] GROUNDING SYSTEM

[76] Inventor: Cheng-Hsun Wu, No. 181 Chin Hwa Road 4 Sec, Tuinan, Taiwan

[21] Appl. No.: 908,063

[22] Filed: Sep. 16, 1986

[51] Int. Cl.⁴ .............................................. H02H 3/16
[52] U.S. Cl. ....................................... 361/42; 307/327
[58] Field of Search ............................. 361/42, 87, 83; 307/326; 340/650, 664; 324/51, 522; 174/6

[56] References Cited

U.S. PATENT DOCUMENTS

| | | | |
|---|---|---|---|
| 3,494,849 | 2/1970 | Hess | 174/6 X |
| 3,725,669 | 4/1973 | Tatum | 174/6 X |
| 4,398,188 | 8/1983 | Feigal et al. | 340/650 |
| 4,567,540 | 1/1986 | Ruta | 361/93 |

Primary Examiner—A. D. Pellinen
Assistant Examiner—Derek S. Jennings
Attorney, Agent, or Firm—Armstrong, Nikaido, Marmelstein & Kubovcik

[57] ABSTRACT

An improved grounding system comprises a tube which is vertically buried under the ground and cut with a plurality of holes at its lower part, and receives a wire inside it. The wire connects at its top with a set of current leakage detector that alarms a small leakage by a light and turns off power automatically in case of a rather big leakage. The lower end of the wire links with a conductive electrode that is also placed in the tube and is immersed in the underground water so as to be able to release electricity to the ground without keeping any store of potential. Therefore, the electrical appliances including lightening rod conductors equipped with this device can be safely used without producing any shock.

6 Claims, 7 Drawing Sheets

GROUNDING SYSTEM

BACKGROUND OF THE INVENTION

The electrical voltage generally used in houses ranges from 110 to 220 volt, which is not deemed so high that the grounding system is easily ignored. The grounding material commonly used is a steel rod electroplated with copper, which is buried 30–100 cm deep under the ground and the lighting rod conductor is made of a plate of copper welded with a copper rod which is exposed above ground as shown in FIG. 1. The release electrode of such grounding is not always buried deep under the ground where much concrete, sand, stone or gravel lie. These materials are bad conductors. In addition, if the grounding electrode is located in a dry place and any current leakage occurs, a shock will result from touching the grounding wire because of the potential existing between the grounding wire and the ground. In other words, the grounding wire is capable of releasing some but not all current which results from imperfect grounding. What's more, when current leakage is found, it is impossible to know which electric appliance is leaking, and even if a great deal of leakage should occur, the power cannot be shut off automatically.

The present invention is to improve the aforementioned problems in order to avoid any loss of life and property caused by an electric leakage.

SUMMARY OF THE INVENTION

This invention has a tube which is buried vertically under ground and bored with a number of water holes around its lower part and envelops a wire that is connected with a set of current leakage detector able to sense leaking current and shut off the power automatically at its upper end, and a release electrode welded with a plurality of grids at its lower end.

Via the contact of the electrode and the underground water, this invention becomes a rapid current releasing assembly.

BRIEF DESCRIPTION OF THE DRAWINGS

FIG. 6-1 is the diagram of the current leakage detector in this invention.

FIG. 6-2 is the diagram of the current leakage detector in this invention.

DETAILED DESCRIPTION OF THE INVENTION

Figure 2:
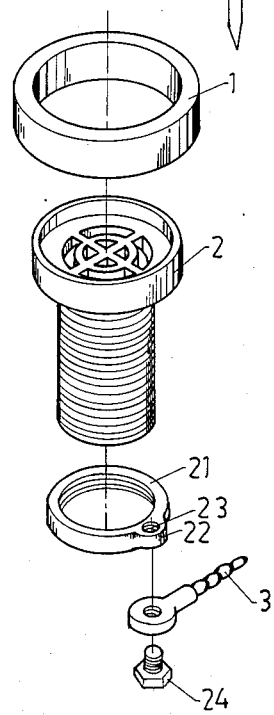
FIG. 2 is the analytical view of the structure of the grounding method for a draining exit conduit used in this invention.
Figure 7:
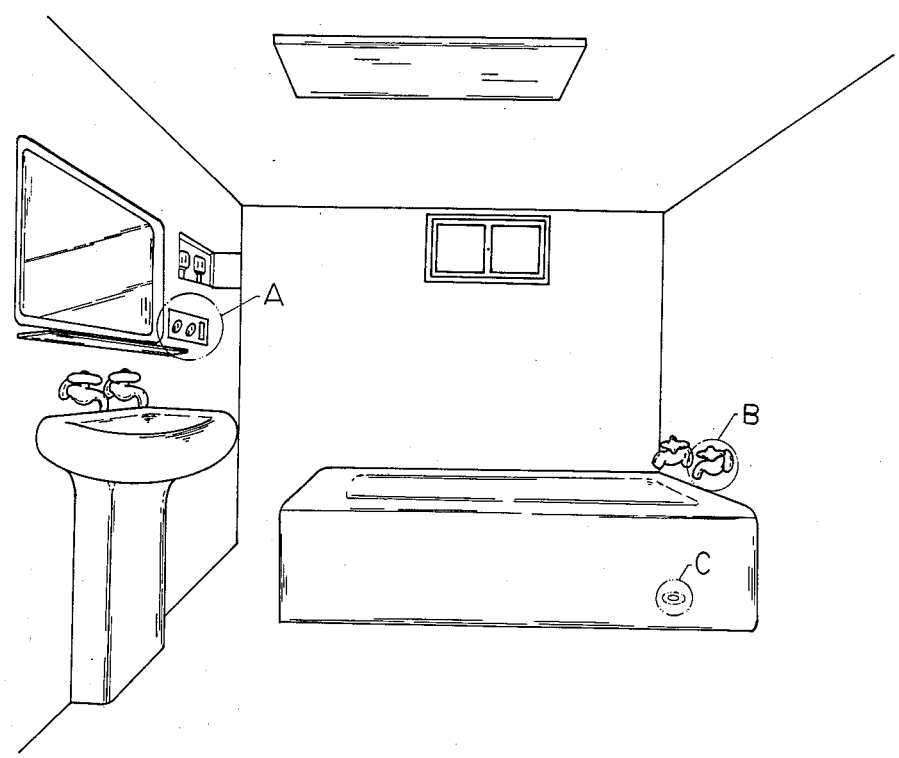
FIG. 7 is the view of locations where household appliances are connected with this invention.
Figure 10:
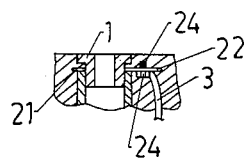
FIG. 10 is the view of the draining exit of a bathtub connected with a grounding wire to this invention.

FIG. 2 shows the method of fixing a ground wire 3 at the bottom of a draining exit 1 for a faucet, bathtub, or kitchen cabinet, etc. as shown in FIG. 7 the C part and FIG. 10. A metallic ring 21 is screwed to the bottom of the exit conduit 2 made of conductive metal. The metallic ring 21 possesses a projection 22 with a screw hole 23 at its center for a screw 24 to fix a grounding wire 3 so as to detect the current leakage in draining systems. The smoke exhaust, handrails, etc. can also be equipped with a grounding wire by the method mentioned above.

Figure 8:
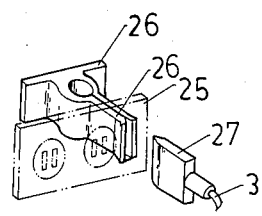
FIG. 8 is the view of a receptacle and a plug used for any electric appliance which will use this invention.

FIG. 7 shows a receptacle for electric appliance -A part- and a faucet 28 -B part-, which can be attached with this grounding wire. FIG. 8 shows an analytical view of A part, a receptacle in FIG. 7. A plug 27 can be inserted into a clamp 26 of the receptacle 25 and the grounding wire is connected with the plug 27.

Figure 9:
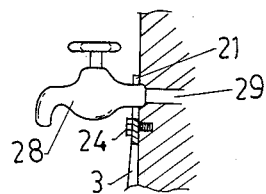
FIG. 9 is the view of a faucet connected with a grounding wire to this invention.

FIG. 9 shows the method of fixing the grounding wire at the faucet 28. If the electricity used by an electric water heater leaks, the water coming out of the faucet will have electricity. The connecting part of the faucet 28 and the water conduit 29 is set with the metallic ring 21 the same as that mentioned-above and the grounding wire 3 is screwed by a screw 24 to link with the faucet 28 so that no shock or severe accident may happen in case of a current leakage.

Figure 1:
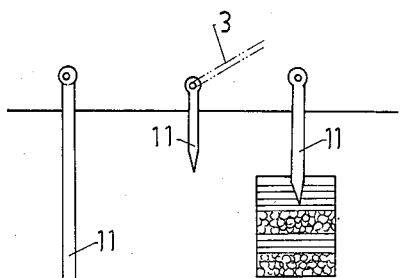
FIG. 1 is the general view of a conventional grounding method.
Figure 3:
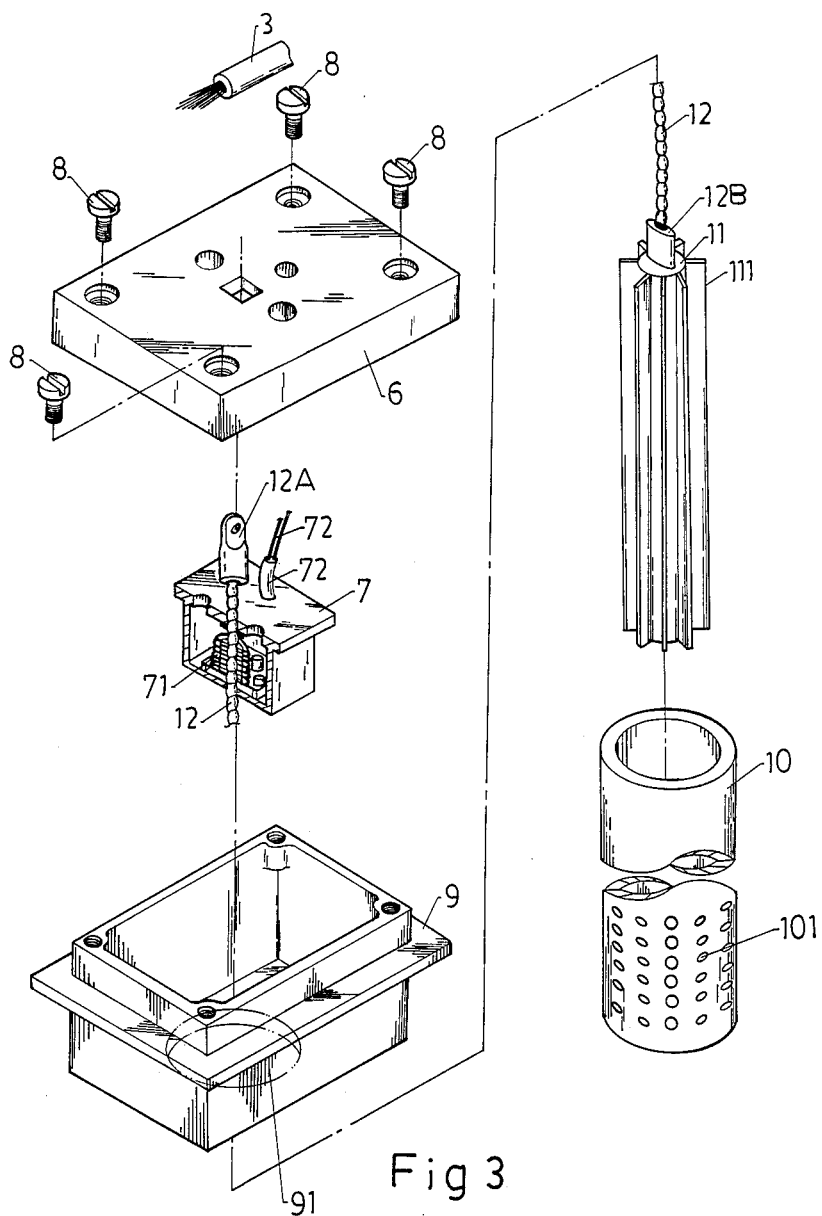
FIG. 3 is the analytical view of the parts constituting the grounding system in this invention.
Figure 4:
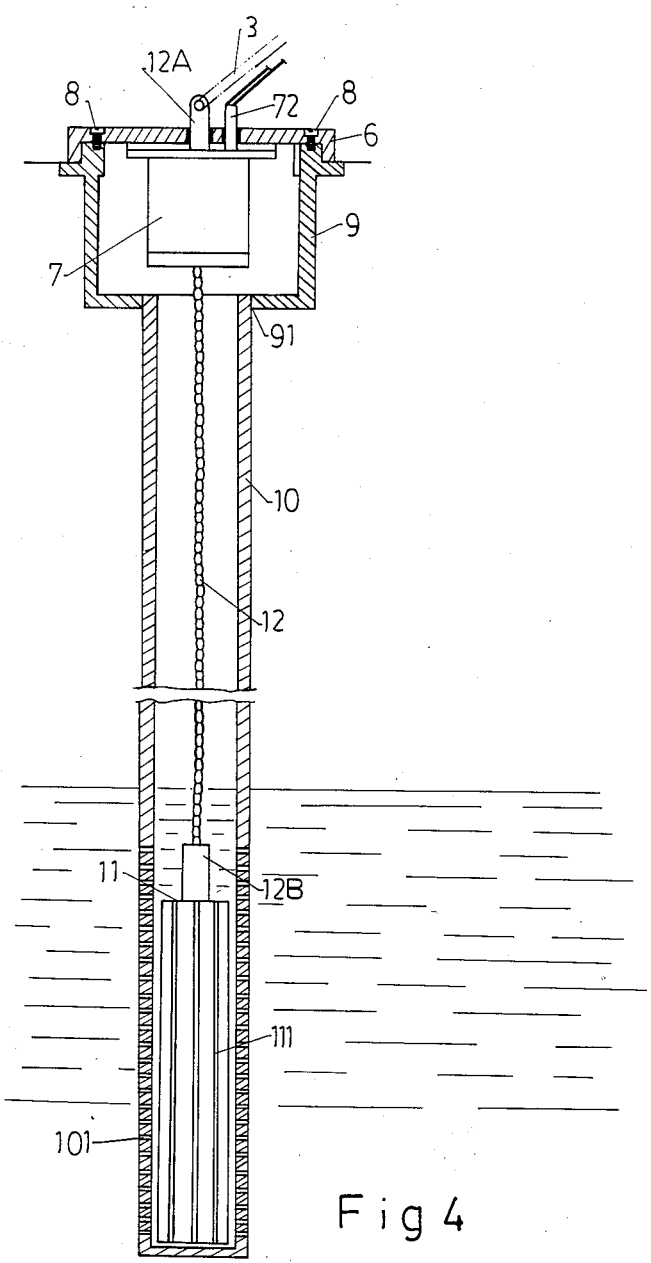
FIG. 4 is the cross-sectioned view of the grounding system in this invention.
Figure 5A:
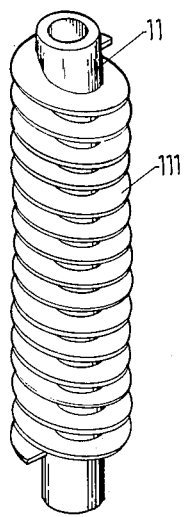
FIGS. 5A–5D is the outward view of several release electroded in this invention.
Figure 5B:
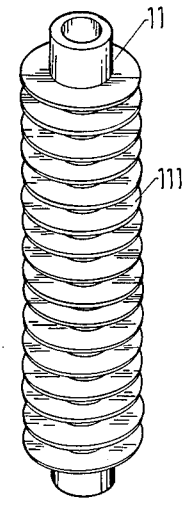
Figure 5C:
Figure 5D:
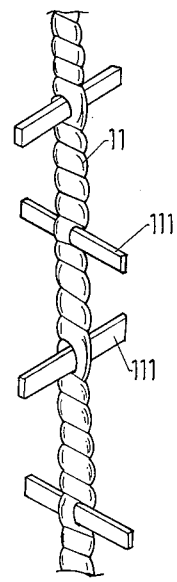
Figures 1, 6:
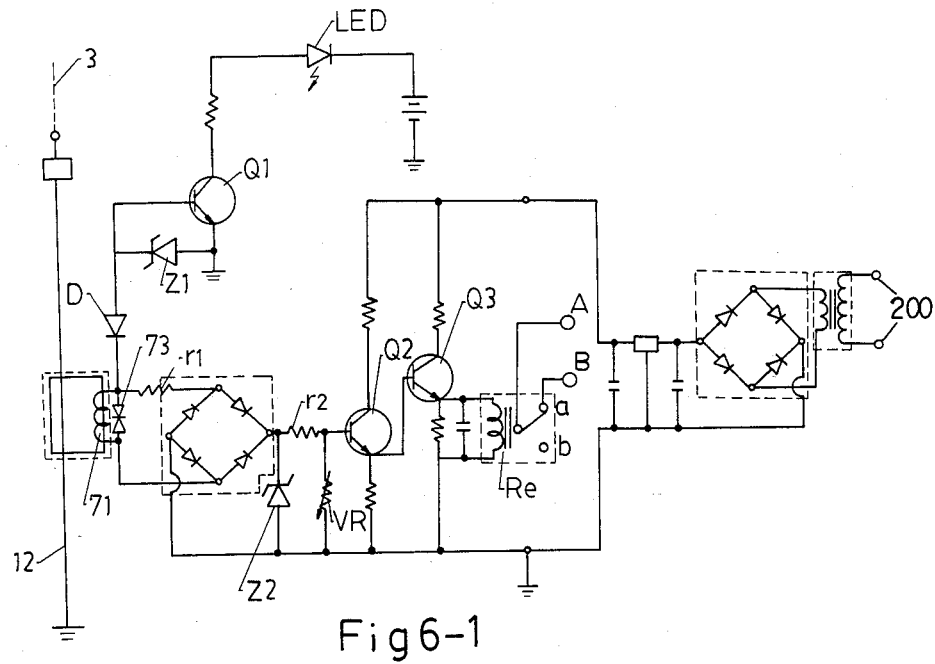
Figures 2, 6:
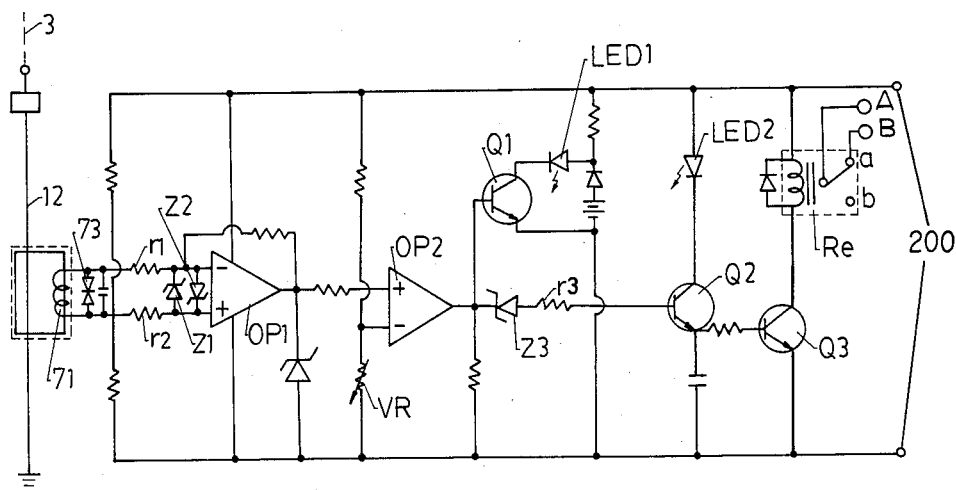

The grounding wire 3 linked with all the electric appliances must be guided downward to a set of wire connectors 7 (Shown in FIG. 3) in which is put a set of current leakage detectors that are able to sense a current leakage and tells its associated circuit to turn off the power. The wire connector 7 comprises a lid 6, a case 9, a connector 7, a set of leakage detectors—FIGS. 6-1, 6-2 show the diagrams of the electric circuits— and a tube 10. As shown in FIGS. 3, 4, the connector 7 is penetrated by a wire 12 which is to link with the grounding wire 3 at one of its ends 12A and with a release electrode 11 at the other end 12B. The release electrode 11 is placed in the tube 10 and has a plurality of grids 111 welded around itself.

The release electrode 11 actually is a tin-plated copper rod welded with pieces of grids. The lower part of the tube 10 is bored with a plurality of holes 101 very close to each other. The upper end of the tube 10 is welded as a unit with a central hole 91 in the bottom of the case 9.

The current leakage detector is contained inside the connector 7. The wire 12 passes through the empty center of an inductance coil 71 in the detector. A cord wire 72 of the shut-off system against leakage and the end 12A of the wire 12 extend outwards through the holes of a lid 6. The lid 6 covers the case 9 and is fastened with bolts 8 together with the case 9.

The tube 10 is to be buried under ground in which hard water exists. Through the holes 101 water can flow into the tube 10 and immerse the electrode 11 with the grids 111. Because hard water it containing more ions than soft water is more conductive, so that current leakage can be released easily through the electrode 11 to the water and then into the ground without any potential left.

The grids 111, according to the inventor's experiment, can be shaped as a screw or a ring, etc. as shown in FIG. 5.

Due to the great capability of the electrode 11 in releasing electricity, it can endure a rather high voltage and lightning, so it can also be used as a releasing means for lightning rod conductor but must be separated from those for electric appliances so as to avoid interference with static electricity and high voltage.

When a human body touches an object with a potential, the body, being conductive, will form a resistance which is dangerous to human life when a large leakage occurs. In order to make both a slight leakage be detected and signaled immediately and a strong leakage which is dangerous to human beings both be detected and to automatically turn off the power, this invention is equipped with a set of current leakage detectors in the connector 7. FIGS. 6-1, 6-2 are the diagrams of the electric circuit which receive power from a power supply 200. When the electric appliances equipped with this invention happens to leak current, it will be transfered via the grounding wire 3, the wire 12 and the release electrode 11 to the ground, and meanwhile the inductance coil 71 in the detector will sense it at once.

In FIG. 6-1, the potential sensed by the coil 71 is transfered to a TNR (a metal oxide varistor) 73 to prevent peak voltage from burning off the circuit, then transfered to a current limiting resistor r1, a diode D and a zener diode Z1 so that a transistor Q1 is biased and a light emitting diode LED is lit to indicate which appliance is leaking. If such a potential treated by a zener diode Z2, a current limiting resistor r2 and a varible resistor VR is so high as to make a transistor Q2 biased, it will be amplified by a transistor Q3 and sent to a relay Re, whose connecting point will jump from A to B separating the power connecting point A and B. This forms an open circuit which can naturally prevent the danger of leakage from occurring.

FIG. 6-2 shows that the coil 71 outputs the induced potential which passes through the TNR 73, current limiting resistors r1, r2 and zener diodes Z1, Z2—both of which are connected in parallel to give them reverse polarity preventing change in the polarity of the induced voltage. The induced potential then passes an operational amplifier OP1. Next, it is transfered to a comparative operational amplifier OP2 which compares and amplifies the signal supplying a bias to a transistor Q1 to make a light emitting diode LED1 light up as an alarm for small current leakage. The LED1 is equipped with a yellow light representing some appliance is leaking current but not so strong as to incur a danger. But if the potential sensed by the coil 71 is high enough to pass through a zener diode Z3 and a current limiting resistor r3 to bias a transistor Q2 lighting a lighting emitted diode LED2, and then it will be amplified by a transistor Q3 resulting in shutting off the power by separating the connecting point A from B.

The detecting system composed of this invention can be installed separatedly in a drawing room, bathroom, bedroom, kitchen, etc. If any leakage happens, the detecting system will tell which appliance is leaking; then only the one that is leaking has to be turned off without affecting the use of other appliances.

Conclusively, with the arrangement of connecting the grounding wire, releasing a potential, a leak-alarm light and automatically turning off the power, this invention really possesses the advantages listed below.
1. Ability in releasing potential rapidly and effectively.
2. The potential of the grounding wire is always kept at zero or ground potential.
3. The device has a safe and simple structure.
4. The device is handy to repair; in other words, the grounding wire and the release electrode can be taken out easily for maintenance or replaced with a new one at any time, is safer and more practical than the conventional one which is buried in the ground without attention to its oxidization.

What is claimed is:
1. A ground system comprising:
a ground wire;
automatic shut-off means; and
wire connecting means, said wire connecting means including
a case having a bottom with a central hole,
a tube having an upper and lower part, said lower part of said tube having a plurality of closely bored holes,
said upper part of said tube being connected to said central hole in the bottom of said case,
release electrode having a plurality of grids welded around itself, said release electrode being placed inside said tube,
connecting wire having first and second ends, said first end linked to said ground wire and said second end connected to said release electrode,
a set of leakage detectors for sensing leaking current,
cord wire connecting said leakage detectors and said automatic shut-off means,
a lid having holes through which said cord wire and said first end of said connecting wire extend outward, said lid covering said case, and
fastening means for fastening said lid to said case,
said tube being buried under ground which contains ground water, said ground water flowing through said plurality of holes into said tube to contact said release electrode to release current leakage through said release electrode into the water.
2. A grounding system as claimed in claim 1, wherein said ground wire is fixed to a metallic ring which is set below an exit conduit, said metallic ring has a projection which is bored with a hole for fixing said grounding wire thereto.
3. A grounding system as claimed in claim 1, wherein the grids of the electrode can be shaped as a screw with a big surface area so as to contact with water in a large space of area.
4. A grounding system as claimed in claim 1, wherein the set of current leakage detectors has an inductance coil which is penetrated by a wire and can induce any potential so as to give a leaking alarm or additionally turn off automatically a part or all of the power.
5. A grounding system as claimed in claim 1, wherein each of said leakage detectors has an induction coil for sensing leaking current and for converting said leakage current into voltage, and wherein said automatic shut-off means receives said voltage from said induction coil, said automatic shut-off means comprises a relay circuit for turning-off power when a resistor in said relay circuit is biased, said automatic shut-off means further comprising
first and second circuits, each circuit comprising (a) a current limiting resistor, (b) zener diodes means connected to said current limiting resistor, (c) rectifying means connected to said zener diodes means, and (d) first and second alarm means which produce an alarm when biased by said current limiting resistor, said second circuit being connected to said relay circuit, said first alarm means being activated when a leakage current is detected, and said second alarm means and said relay circuit being activated when said leakage current is high enough to pass through said second circuit, said relay circuit relocating a contact point so that the power, used by the leaking current, is to be automatically cut-off.

6. A grounding system as claimed in claim 1, wherein the grids of the electrode can be shaped as a ring with a big surface area so as to contact with water in a large space of area.

* * * * *